United States Patent Office 3,305,192
Patented Feb. 21, 1967

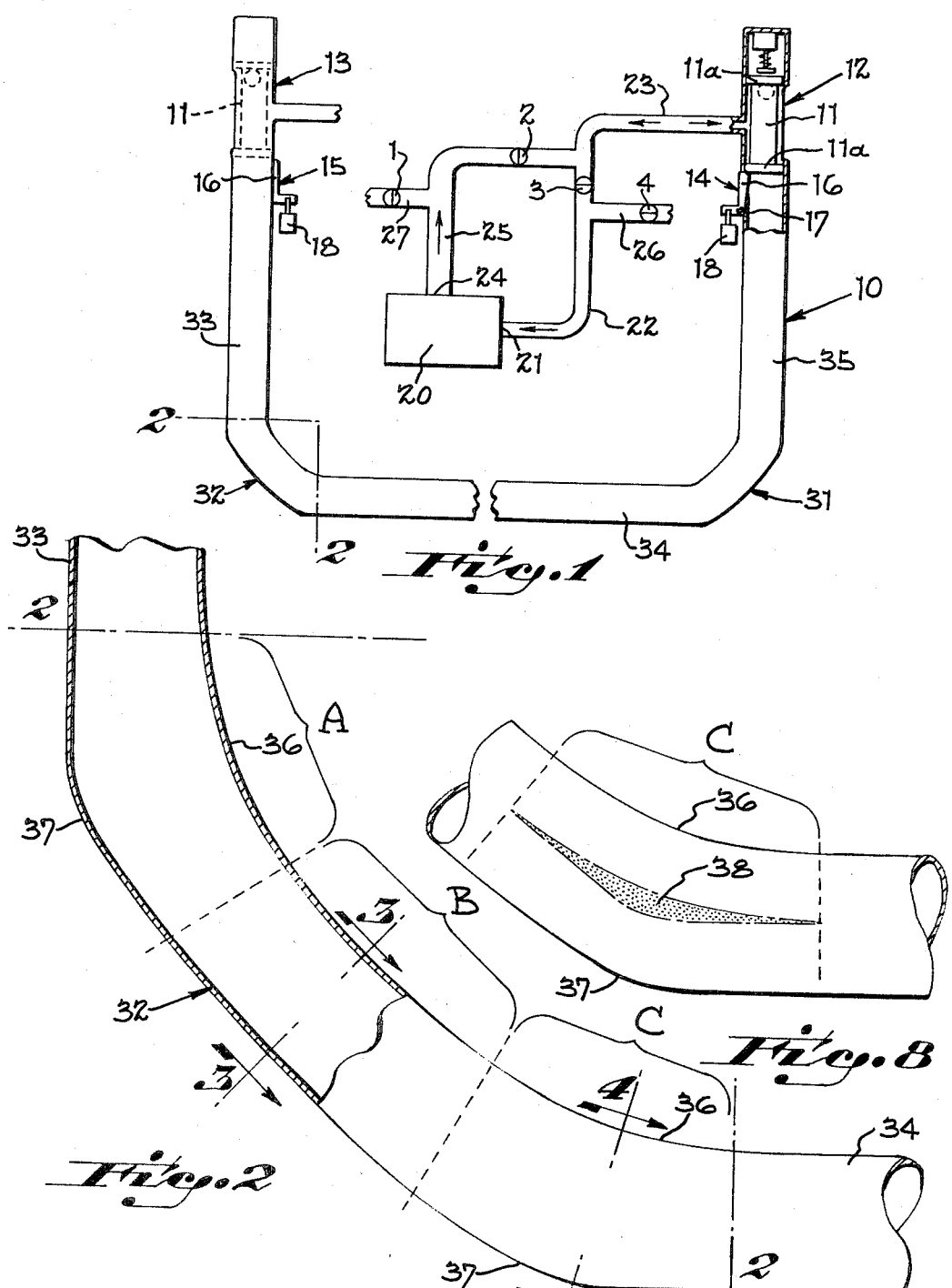

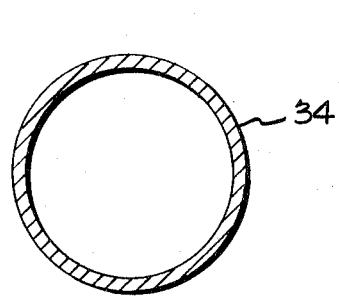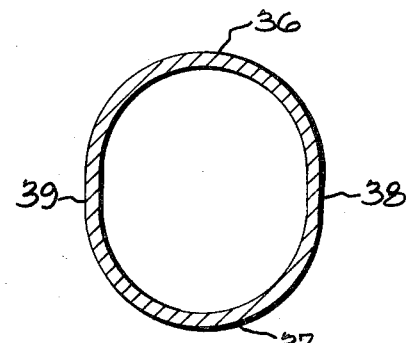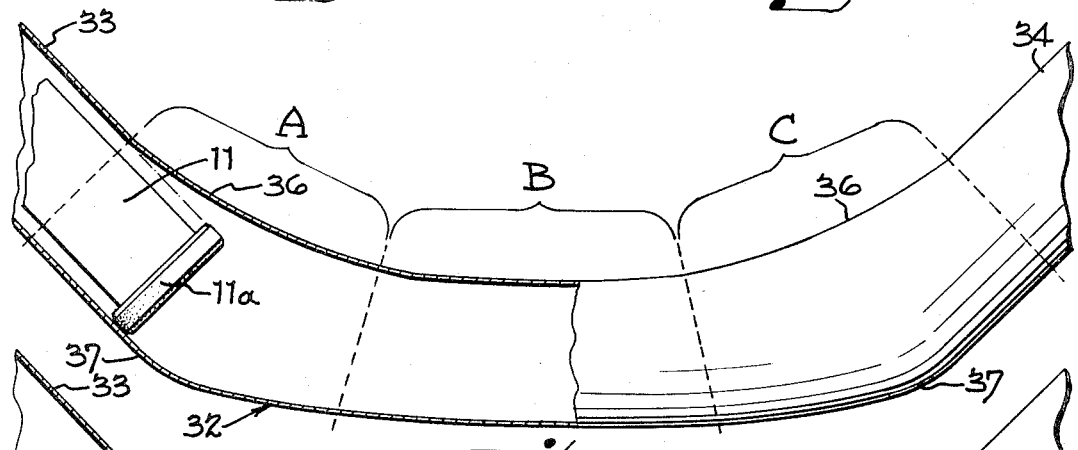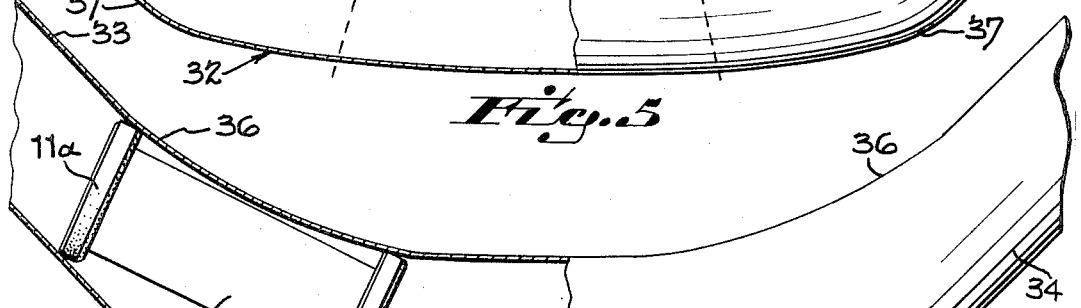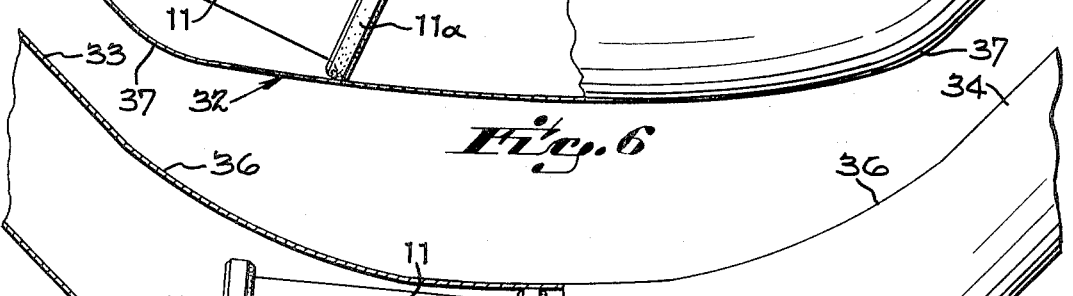

3,305,192
METHOD AND APPARATUS FOR TRANSFERRING A CARRIER THROUGH A PNEUMATIC CONVEYOR SYSTEM
Gerhard H. Todt, Ringwood, and Lewis D. O. Tearne, Montvale, N.J., assignors to The Mosler Safe Company, Hamilton, Ohio, a corporation of New York
Filed Mar. 18, 1966, Ser. No. 535,519
7 Claims. (Cl. 243—38)

This invention relates to pneumatic conveyor systems, and more particularly, to an improved conduit for use in such systems.

Pneumatic conveyor systems have long been known and used for conveying articles between stations of a multiple station transfer system. Such systems usually incorporate a network of tubular conduits through which a transfer vehicle or carrier is propelled between stations by a pressure differential in the conduits. The propellent may be either air pressure above that of the atmosphere, in which case the vehicle is pushed through the tube, or it may be pressure below that of the atmosphere in which event the vehicle is pulled through the tube. In either case, an air seal must exist between the transfer medium and the tube. This seal is usually effected by a pair of resilient sealing rings circumscribing or surrounding the opposite ends of the carrier.

In order to change the direction of motion of a carrier in a pneumatic tube system, the carrier must usually travel through a curved section of the conduit without breaking the seal between the carrier and the tube. The exception to this rule is where gravity or carrier momentum may be relied upon to maintain the motion of the carrier throughout the turn. Gravity may not be relied upon in any system which is designed for two way travel; that is, travel in opposite directions in the same tube. Thus, while gravity may carry the transfer vehicle in one direction through a tube, it cannot be relied upon to move the carrier in the opposite direction. Likewise, momentum cannot usually be relied upon to continue movement of a carrier throughout a turn after loss of the air seal between the carrier and the tube. Momentum is dependent upon the rate of travel of the carrier through the turn which in turn is dependent upon numerous variables such as seal wear, compressor wear, weight of the carrier loaded and unloaded, etc. All of these variables dictate that sooner or later the rate of travel of the carrier is going to be too slow to carry it through the turn and, if no seal is available, that conduits will have to be torn apart to remove the immobilized carrier.

These considerations dictate that in most installations, a seal must be maintained between the carrier and the conduit for the full length of the conduit. Maintenance of this seal has traditionally necessitated fixed cross-sectional shape of the conduit and large radius bends in order to change the direction of carrier travel without impeding the motion of the carrier through the conduit. However, shallow or large radius turns are often undesirable and difficult to accommodate, as for example where space is critical or where air conditioning ducts, water pipes and electrical conduits present obstacles to a smooth, large radius turn.

It has, therefore, been a primary objective of this invention to shorten the radius of curvature of pneumatic tube conduits without sacrificing the seal between the carrier and the conduit as a carrier moves through the curve and without substantially impeding the movement of the carrier through the conduit.

This objective is achieved and this invention is predicated upon the concept of maintaining the seal at the trailing end of a carrier while the seal is broken at the front end and the front end of the carrier is moved through an expanded short radius bend of the conduit and thereafter establishing the seal at the front end of the conduit while the trailing end is moved through the same expanded short radius bend so that the seal is never effectively lost between the carrier and the conduit.

The present invention consists of a pneumatic tube conduit which includes an intermediate sharply curved or bent section of expanded cross-sectional area and of a length less than the overall length of the carrier. This intermediate curved section connects two lengths of unexpanded conduit of the same internal shape and size as the seals of the carrier so that the carrier always moves from one unexpanded and sealed section to another unexpanded sealed section through an expanded and curved section without simultaneously losing the seals at both ends of the carrier. By connecting the expanded curved sections in series separated by either straight or large radius unexpanded sections, the carrier may be made to travel through a sharp 90° or more turn.

The primary advantage of this invention is that it substantially shortens the effective radius of a curved pneumatic tube conveyor and thus facilitates installation at less cost and in many locations where not otherwise practical.

These and other objects and advantages of this invention will be more deadily apparent from the following description of the drawings in which:

FIGURE 1 is a diagrammatic illustration of a pneumatic conveyor system incorporating the invention of this application, FIGURE 2 is an enlarged side elevational view, partially broken away, of a curved corner section of the conduit, FIGURE 3 is a cross-sectional view taken along line 3—3 of FIGURE 2, FIGURE 4 is a cross-sectional view taken along line 4—4 of FIGURE 2, FIGURES 5, 6 and 7 are sequential views of a curved corner section of the conduit illustrating the progress of a carrier through the conduit, and FIGURE 8 is a side elevational view of a portion of the curved corner section of the conduit of FIGURE 2.

Referring to FIGURE 1, it will be seen that the pneumatic tube conveyor system of this invention includes a generally U-shaped conveyor tube 10 for transferring a carrier 11 between stations 12 and 13 at opposite ends of the pneumatic tube 10. The carrier 11 is a conventional circular cross-section closed tube which has peripheral sealing rings 11a surrounding its ends. The sealing rings 11a are generally of the same peripheral size and shape as the interior cross-sectional size and shape of the tube or conduit 10 so that the rings effectively form an air seal between the carrier 11 and the tube 10.

The carrier 11 is held in a vertical position when located at either of the stations 12 and 13 by electrically operated latches 14 and 15. These latches 14, 15 each comprise a bell crank 16 mounted for pivotal movement upon a pivot pin 17. The vertical leg of the bell crank 16 is tapered and normally extends through a slot into the pneumatic tube 10. When the carrier is located at either of the stations, the lower portion of the carrier rests upon and is supported by the upper end of the bell crank 16. To withdraw the bell crank from a supporting position beneath the carriers 11, a solenoid 18 is connected to the horizontal leg of the crank 16. When energized, the solenoid 18 causes the crank to be pivoted about the pivot pin 17 and withdrawn from a position beneath the carrier. As a result, whenever the solenoid is energized, the carrier is free to drop down into a lower portion of the pneumatic tube.

A push-pull type of conventional pneumatic system is provided to propel the carrier from one station to the other. The push-pull pneumatic system comprises a motor driven blower 20 having its air intake port 21 connected by air flow tubes 22 and 23 to the conveyor tube 10 at the station 12. The blower 20 exhaust port 24 is connected by an air flow tube 25 to the air flow tube 23. An air intake tube 26 extends off of the air flow tube 22 and a similar air exhaust tube 27 extends off of the air flow tube 25. Each of the air flow tubes 27, 25, 22 and 26 has an electrically actuated windgates 1, 2, 3 and 4, respectively, located therein.

The electrically actuated windgates 1, 2, 3 and 4 and the electrically actuated latches 14 and 15 are controlled by electrical switches through conventional circuitry. Since the pneumatic propellent system together with its associated control circuitry is conventional and forms no part of this invention, the control circuit has not been illustrated. One suitable control circuit is illustrated in Ellithorpe Patent No. 2,916,066.

The windgates are all normally closed and the latches are normally in a position in which the tapered portion of the latch 15 yieldably extends inwardly into the pneumatic tube. To move the carrier from the station 12 to the station 13, a control switch (not shown) is actuated to cause the solenoid 18 to pivot the latch 14 out of engagement with the carrier 11 so that the carrier drops down into a lower portion of the tube 10. This switch also causes the windgates 2 and 4 to open so that air is blown through the air flow tubes 25 and 23 to the conveyor tube 10. This air flow pushes the carrier around to the station 13. As the carrier passes by the tapered portion of the latch 15 at the station 13, it forces or cams the latch outwardly to allow the carrier to pass. After the carrier has passed the latch 15, the latch returns into the tube 10 beneath the carrier so that it prevents the carrier from dropping back down into a lower portion of the tube 10. After the carrier has reached the station 13, the windgates 2 and 4 are caused to close by actuation of any conventional control means such as a switch actuated by the carrier at the station 13.

In order to move the carrier from the station 13 to the station 12, a second control switch (not shown) energizes the solenoid of the electrically operated latch 15 and pulls this latch out of engagement with the carrier 11. The carrier then drops into the lower portion of the carrier tube 10. Simultaneously with the actuation of the electric latch 15, the windgates 1 and 3 are caused to open by means of a conventional control circuit and with the windgates 2 and 4 remaining closed, a suction is created in the air flow tubes 23 and 22 which operates to pull the carrier 11 around and into the station 12.

The pneumatic tube conveyor 10 is generally U-shaped and comprises a pair of right angle turns or curved sections 31, 32 of the conduit 10. This invention is predicated upon these novel curved sections and the method by which a carrier 11 is transported through them. While one form of pneumatic conveyor system has been specifically described hereinabove in order to identify the environment of use of the invention of this application, it will be readily apparent that the invention of this application is applicable to all types of enclosed conduit transfer systems and is not to be limited to this single specific type of pneumatic tube transfer system.

Both of the curved sections 31, 32 of the conduit 10 are identical and therefore only one 32 has been illustrated in detail. As may be seen in FIGURES 1 and 2, the curved section 32 is defined between the dashed line 2—2. It comprises three serially interconnected curved sections A, B and C which are joined at their ends to linear sections 33 and 34 of the conduit 10. Similarly, the curved section 31 of the conduit is connected at its ends to linear sections 34 and 35 of the conduit.

The linear sections 33, 34 and 35 of the conduit 10 are all circular in cross-section and of approximately the same internal diameter as the external diameter of the sealing rings 11a of the carrier 11. Thus, the rings 11a of the carrier always form an air seal between the carrier and the linear sections of the conduit. Similarly, the intermediate curved section B of the conduit 10 is circular in cross-section and of the same internal diameter as the external diameter of the sealing rings 11a so that the rings form an air seal with this section B.

Sections A and C of the curved portion of the conduit are identical and are expanded in the plane of curvature of the tube so that they are of greater cross-sectional area than the intermediate curved section B or the linear sections 33, 34 and 35 of the conduit. As may be seen most clearly in FIGURES 4 and 8, these enlarged or expanded curved sections A and C are oblong in cross-sectional shape. They are formed from an inner semi-cylindrical section 36, an outer semi-cylindrical section 37, and a pair of generally crescent shaped flat sections 38 and 39. The inner semi-cylindrical section 36 is bent or curved about a radius which is greater than the radius of curvature about which the outer semi-cylindrical section 37 is curved so that when placed in juxtaposition, the side edges of these curved semi-cylindrical sections define a crescent shaped area. This area is filled by the flat crescent shaped sections 38 and 39 of the curved expanded sections A and C of the tube. For purposes of clarifying the drawings, the crescent shaped area 38 has been enclosed in dashed lines and stippled in FIGURE 8.

The intermediate curved section B of the curved portion of the conduit 32 is circular in cross section throughout its length and is curved about a standard bend radius. In the industry, a "standard bend radius" is defined as the shortest radius about which a fixed or constant cross-sectional diameter and area tube may be curved to transport a selected size carrier through a turn.

The length and bend radius of the sections A, B and C of the conduit 10 are determined by the length of a carrier to be transmitted through the conduit. The length of the curved sections A and C must be no longer than the length of the carrier and the length of the intermediate section B must be at least as long as the distance between the sealing rings 11a of the carrier 11. These comparative dimensions are required in order to avoid the loss of the air seal between the carrier 11 and the tube 10 as is explained more fully hereinafter.

Referring now to FIGURES 5, 6 and 7, it will be seen that in travelling through the linear sections 33, 34 and 35 of the conduit, the seals 11a of the carrier 11 maintain an air seal between the conduit and the carrier. Referring to FIGURE 5, it will be seen that as the carrier enters the expanded curved section A of the conduit, the seal 11a on the leading end of the carrier is released from sealed engagement with the conduit. However, the seal on the trailing end of the carrier remains in sealed engagement with the linear section 33 of the conduit until the seal on the leading edge of the carrier reaches the curved section B of the conduit. Because the curved expanded section A is no longer than the overall length of the carrier, the leading seal 11a will reach and establish sealed engagement with the curved conduit section B before the trailing seal releases its sealed engagement with the conduit.

Upon continued movement of the carrier through the curved section 32 of the conduit, the seal 11a on the leading edge of the carrier remains in sealed engagement with the curved section B while the trailing seal is released from engagement and travels through the expanded curved section A. Because the interior configuration of the curved section B is of the same cross-sectional size and shape as the periphery of the seals 11a of the carrier 11, both seals establish sealed engagement with the section B during their travel past this curved section. This section B is at least as long as the distance between the seals 11a so that the rear seal will have established engagement with this curved section B before the leading seal enters the curved section C. While the non-expanded section B has been described as being curved, it will be appreciated that this section could just as readily and with very little sacrifice in the overall effective radius of the curved section 32 of the conduit, be linear rather than curved. However, curving the intermediate section B minimizes the effective radius of the curves 31 and 32.

Upon continued forward movement of the carrier 11 through the curved expanded section C of the conduit, the trailing seal 11a of the carrier 11 maintains sealed engagement with the intermediate section B of the conduit unit the leading seal 11a breaks over into the linear section 34 and establishes sealed engagement with it. Thereafter, the leading seal 11a maintains sealed engagement with the linear section 34 of the conduit as the trailing seal moves through the expanded curved section C of the conduit. Of course, the same sealed relationship between the carrier and tube is maintained when the carrier's direction of movement is reversed through the conduit 10.

The primary advantage of the curved conduit described herein is that it enables a selected diameter and length carrier to be moved through a minimum radius curved section of a conduit without the loss of sealed engagement between the carrier and the conduit. As one example of the improvement affected by this invention, the minimum radius turn heretofore required in order for a circular cross-sectional tube to accommodate a standard 4½ inch diameter by 11 inch carrier through a curved section of conduit while maintaining a seal between the carrier and tube has been 48 inches. The invention of this application has enabled the effective turn radius required to accommodate this standard size carrier to be shortened to 19½ inches.

While the invention of this application has been described in relation to a circular cross-section carrier and conduit, those skilled in the art to which this invention pertains will readily appreciate that this invention is equally applicable to conveyor systems which utilize carriers of oval, rectangular, or other standard cross-sectional configurations. Similarly, those skilled in this art will readily appreciate numerous other changes and modifications which may be made without departing from the spirit of our invention. Therefore, we do not intend to be limited except by the scope of the appended claims.

Having described our invention, we claim:

1. A conduit for use in a pneumatic tube conveyor system of the type used for transferring a rigid carrier between a plurality of stations, said carrier having spaced peripheral sealing rings attached to its opposite ends, the improvement which comprises,
   serially connected first, second and third sections of said conduit,
   said first section having an internal cross-sectional size and shape approximately the same as the peripheral size and shape of the sealing rings of the carrier so that the carrier rings remain in sealed engagement with said first section of the conduit as said carrier moves through said first section,
   said second section being curved and of greater cross-sectional size than said first section and operable to release the seals of the carrier from sealed engagement with the conduit as the carrier moves through said second curved section, and
   said third section being of the same cross-sectional size and shape as said first section and operable to maintain sealed engagement with the carrier as the carrier moves through said third section,
   said second curved section being no longer than the length of the carrier so that one of the seals of the carrier remains in sealed engagement with either the first or third section of the conduit as said carrier moves through said second curved section.

2. The conduit of claim 1 wherein said first and third sections of said conduit are of circular cross-section and said second section is non-circular in cross-section.

3. The conduit of claim 1 wherein said third section of said conduit is curved in the same direction as said second section and is at least as long as the distance between the seals of the carrier to be transferred through said conduit.

4. A conduit for use in a pneumatic tube conveyor system of the type used for transferring a rigid carrier between a plurality of stations, said carrier having spaced peripheral sealing rings attached to its opposite ends, the improvement which comprises,
   serially connected first, second, third, fourth and fifth sections of said conduit,
   said first section having an internal cross-sectional size and shape approximately the same as the peripheral size and shape of the sealing rings of the carrier to be transferred through the conduit so that the carrier rings remain in sealed engagement with said first section of the conduit as said carrier moves through said first section,
   said second section being curved and of greater cross-sectional size than said first section and operable to release the seals of the carrier from sealed engagement with the conduit as the carrier moves through said second curved section,
   said third section being curved and of the same cross-sectional size and shape as said first section and operable to maintain sealed engagement with the carrier as the carrier moves through said third section,
   said fourth section being curved and of greater cross-sectional size than said first section and operable to release the seals of the carrier from sealed engagement with the conduit as the carrier moves through said fourth curved section, and
   said fifth section being of the same cross-sectional size and shape as said first section and operable to maintain sealed engagement with the carrier as the carrier moves through said fifth section,
   said second and fourth curved sections being no longer than the length of the carrier so that one of the seals of the carrier remains in sealed engagement with either the first, third or fifth sections of the conduits as said carrier moves through said second and fourth curved sections.

5. The conduit of claim 4 wherein the interior of said first, third and fifth sections of said conduit are of circular cross-section and said second and fourth sections are non-circular.

6. The conduit of claim 4 wherein said third curved section of said conduit is at least as long as the distance between the seals of the carrier to be transferred through said conduit.

7. A pneumatic tube conveyor system for transferring articles between a plurality of stations, said system comprising,
   a conduit extending between said stations, said conduit including serially connected first, second, third, fourth, and fifth sections,
   a rigid carrier movable through said conduit, said carrier having spaced peripheral sealing rings attached to its opposite ends,
   said first section of said conduit having an internal cross-sectional size and shape approximately the same as the peripheral size and shape of the sealing rings of the carrier to be transferred through the conduit so that the carrier rings remain in sealed engagement with said first section of the conduit as said carrier moves through said first section,
   said second section being curved and of greater cross-sectional size than said first section and operable to release the seals of the carrier from sealed engagement with the conduit as the carrier moves through said second curved section,
   said third section being curved and of the same cross-sectional size and shape as said first section and operable to maintain sealed engagement with the carrier as the carrier moves through said third section, said fourth section being curved and of greater cross-sectional size than said first section and operable to release the seals of the carrier from sealed engagement with the conduit as the carrier moves through said fourth curved section, and said fifth section being of the same cross-sectional size and shape as said first section and operable to maintain sealed engagement with the carrier as the carrier moves through said fifth section, said second and fourth curved sections being no longer than the length of the carrier so that one of the seals of the carrier remains in sealed engagement with either the first, third or fifth sections of the conduits as said carrier moves through said second and fourth curved sections.

References Cited by the Examiner

UNITED STATES PATENTS 411,864  10/1889  Leaycraft _____ 243—38

FOREIGN PATENTS 1,118,101  11/1961  Germany.

EVON C. BLUNK, *Primary Examiner.*

H. C. HORNSBY, *Assistant Examiner.*